United States Patent [19]
Mathai et al.

[11] 3,879,320

[45] Apr. 22, 1975

[54] POLYMERIC COMPOSITIONS

[75] Inventors: John Mathai; Jose J. Chettiath, both of Chicago, Ill.

[73] Assignee: The Sherwin-Williams Company, Cleveland, Ohio

[22] Filed: Oct. 10, 1973

[21] Appl. No.: 404,961

[52] U.S. Cl. ...... 260/23 EP; 260/18 EP; 260/18 PF; 260/23 CP; 260/33.4 EP; 260/89.3
[51] Int. Cl. ............................................ C08g 45/08
[58] Field of Search ............ 260/23 EP, 18 EP:89.3, 260/23 CP, 33.4 EP

[56] References Cited
UNITED STATES PATENTS

| | | | |
|---|---|---|---|
| 1,934,297 | 11/1933 | Eibner et al. | 260/23 |
| 2,596,737 | 5/1952 | Tess et al. | 260/23 |
| 2,826,562 | 3/1958 | Shokal | 260/23 |
| 3,770,675 | 11/1973 | Taft | 260/23 |

FOREIGN PATENTS OR APPLICATIONS

| | | | |
|---|---|---|---|
| 1,154,943 | 3/1960 | Germany | 260/23 |

*Primary Examiner*—Eugene C. Rzucidlo
*Attorney, Agent, or Firm*—James V. Tura; Richard G. Smith

[57] ABSTRACT

This invention relates to polymeric compositions and particularly to film-forming compositions derived from the reaction of at least one aliphatic vinyl ester, e.g. vinyl acetate and an epoxidized fatty oil or fatty acid ester.

13 Claims, No Drawings

POLYMERIC COMPOSITIONS

This invention is directed to polymeric compositions and more specifically to polymeric coating or film-forming compositions derived from epoxidized fatty oils or fatty acid esters and aliphatic vinyl esters. More particularly, the invention relates to the preparation of clear or pigmented films or coatings derived from the vinylation of epoxidized fatty oils or fatty acid esters having at least one oxirane group per molecule.

Epoxidized fatty oils or esters are derived from animal, vegetable or marine oils. These oils and esters may be characterized as glyceryl esters which are substantially straight chained, aliphatic acids of 12 or more carbon atoms and have been epoxidized to provide one or more oxirane groups per molecule. It is generally known that epoxidized oils alone do not possess the properties needed to provide hard films and, therefore, it has been necessary to modify these oils and esters to give them the characteristics required of a good coating or film-forming composition. It has been found in accordance with this invention that the vinylation of an epoxidized fatty oil or ester having at least one oxirane group per molecule produces a homogeneous composition which forms a clear film when cast from solution. Thus, the vinylated compositions of this invention may be used for a variety of purposes including, for example, aerosol coatings, floor sealers, primers and surfacers, stain covers, paper coatings, caulking compositions, adhesives, furniture sealers and particularly as a replacement for shellac.

Clear homogeneous compositions, having excellent film-forming characteristics, are obtained when one or more epoxidized fatty oils or fatty acid esters preferably having more than one epoxide group per molecule are reacted with 50 to 95% by weight of at least one aliphatic vinyl ester monomer. Similar vinylations of unmodified fatty oils, i.e. without the presence of an epoxidized group resulted in cloudy, non-homogeneous compositions from which the vinyl polymer separated into another phase. Although the mechanism of the polymerization of the vinyl ester and the epoxidized fatty acid oil or fatty acid ester is not known, it is believed that the presence of the oxirane oxygen functions as a chain transfer agent during the vinylation via the free radical polymerization of the vinyl monomer and results in a clear homogeneous resin.

Accordingly, it is an object of this invention to provide a hard protective film-forming composition for use as a varnish, sealer, or pigmented paint. It is another object of this invention to provide a clear homogeneous composition having excellent flexibility capable of forming films on plastics, woods, glass, metal, etc. It is still another object of this invention to provide a clear homogeneous shellac substitute which is resistant to alkali, water and solvents at various temperatures. These and other objects of the invention will become apparent from a further and more detailed description as follows.

Specifically, the invention relates to clear homogeneous polymeric compositions obtained by coreacting at temperatures of at least about 50°C and in the presence of an effective amount of an organic peroxide approximately 50 to 95% by weight of at least one aliphatic vinyl ester and about 5 to 50% by weight of at least one epoxidized fatty oil or fatty acid ester having at least one epoxide group per molecule. The coreaction or vinylation of the epoxidized fatty oil or fatty acid ester takes place at temperatures ranging from at least about 50°C up to about 250°C and preferably at temperatures ranging from about 100°C to 170°C in the presence of a small but effective amounts, i.e. from 0.01 to 3.0% by weight of the reactants of at least one organic peroxide initiator. The resinous products may be characterized as extremely viscous liquids or glassy solids which are easily dissolved in an organic solvent. Although vinyl acetate is preferred, other aliphatic vinyl esters having up to about 10 carbon atoms, e.g. preferably 3 to 6 carbon atoms may be used. These vinyl esters include, for example, vinyl butyrate, vinyl propionate, isopropenyl acetate, isopropenyl caproate, etc. and combinations thereof.

The epoxidized monomer, i.e. the epoxy-containing fatty oils or fatty acid esters include the curable epoxidized esters of fatty acids having up to about 36 aliphatic carbon atoms and preferably from about 12 to 22 aliphatic carbon atoms in the acid residue and up to about 16 and preferably from 4 to 12 carbon atoms in the alcohol residue. The esters that may be used to prepare the oxirane-containing fatty acid esters include the natural occurring and synthetically prepared esters of the unsaturated monocarboxylic acids found in the various drying oils or semi-drying oils. These oils include, for example, soybean oil, tall oil, linseed oil, safflower oil, etc. The alcohol residue of these esters are generally derived from polyhydroxy alcohols having at least two hydroxy groups per molecule, including, for example, the glycerols, glycols, alkane diols, erythritols, etc. These fatty acid esters may be prepared by reacting the alcohol, e.g. a mono- or polyhydroxy alcohol with one or more of the fatty acids. The alcohols include the monohydric alkyl and alkenyl alcohols which provide the alcohol moiety, e.g. methyl, ethyl, propyl, isopropyl, butyl, isobutyl, amyl, isoamyl, hexyl, heptyl, octyl, etc. The polyhydric alcohols include, for example, the glycols such as ethylene glycol, diethylene glycol, trimethylene glycol, pentaethylene glycol, hexamethylene glycol, the diols such as propane diol, butane diol, etc., the glycerols, the erythritols, e.g. pentaerythritol, and combinations thereof.

The natural occurring drying or semi-drying oils which comprise unsaturated fatty esters have the characteristic of solidifying or hardening in the presence of air and, therefore, for purposes of this invention, one or more of these natural fatty acid esters or oils may be reacted with the epoxidizing agent, e.g. peracetic acid in an amount sufficient to obtain an epoxidized oil or ester having at least one epoxide group per molecule. The epoxidation of fatty acid esters and fatty oils is known and may be found in more detail in U.S. Pat. No. 2,569,502.

Some specific examples of the epoxy-containing fatty acid esters include methyl epoxystearate, ethyl epoxystearate, isopropyl epoxystearate, butyl epoxystearate, epoxidized 2-ethyl hexyl tallate, epoxidized 1,5-pentane diol dioleate, epoxidized methyloleate, epoxidized glycerol trilinoleate, epoxidized glycerol monooleate, epoxidized glycerol monolinoleate, epoxidized glycerol dilinoleate and the epoxidized esters of the mono-, di or poly pentaerythritols with soybean, tall or linseed oil fatty acids and various combinations of these esters in any proportion. Specific examples of the epoxidized fatty oils include epoxidized peanut oil, epoxidized lard oil, epoxidized olive oil, epoxidized tall oil, epoxidized castor oil, epoxidized tallow oil, epoxidized corn oil, epoxidized cotton seed oil, epoxidized soybean oil, epoxidized linseed oil, etc.

The epoxidized fatty oils or fatty acid esters are coreacted with the vinyl monomer in the presence of an effective amount of an organic peroxide initiator. The initiator is present in the reaction in amounts ranging up to about 3.0% by weight of the monomeric mixture and comprises known organic peroxides and particularly the peroxyesters having a half-life of 1 to 5 minutes at temperatures of about 130°C. The organic peroxides that may be used as the initiator include, for example, acetyl benzoyl peroxide, methyl ethyl ketone peroxide, hydroxy heptyl peroxide, cyclohexanone peroxide, cyclohexyl hydroperoxide, cumene hydroperoxide, butyl hydroperoxide, methyl amyl ketone peroxide, etc.

The following examples illustrate the polymeric compositions and methods of preparing same in accordance with this invention.

EXAMPLE 1

Approximately 200 parts by weight of epoxidized soya oil having about one epoxide group per molecule was added to the reactor fitted with an agitator, inert gas tube, thermometer controller, reflux condenser and dropping funnel. The contents of the reactor were heated to temperatures of about 115°C and approximately 800 parts by weight of vinyl acetate premixed with approximately 48 parts by weight of tertiary-butyl peroxy (2-ethyl) hexoate were added dropwise over a period of about 8 hours while the temperature increased to about 120°C. Subsequently, the reaction temperature was increased to approximately 125°C over a period of about an hour, after which time refluxing stopped. The reaction product was diluted with ethanol to about 50% non-volatile content. The resin solution had a viscosity of 1.2 poise and a Gardner color of 1.

The following examples in Table I, were prepared in accordance with the procedure in Example 1.

The effective amounts of reaction products of this invention may be dissolved or dispersed in some solvents having a kauri butanol value of 33 or higher to form clear varnishes that can be applied to a substrate and then dried under atmospheric conditions to a hard adherent film. Solutions of the reaction products may be thinned with the amount of solvent required to form varnishes of the desired viscosity convenient for application to a surface either by brushing, dipping, spraying, etc. Various solvents may be utilized in preparing the coating including the aliphatic hydrocarbons, the ketones, e.g. methyl ethyl ketones, acetone, the esters, the ethers, the carbitols, the alcohols and particularly the lower molecular weight aliphatic alcohols having up to 8 carbon atoms. The organic solvent, e.g. ethyl alcohol may be present in the coating composition in amounts ranging from about 5 to 99% and preferably from about 20 to 80% by weight of the total mixture. Solutions of the vinyl ester-epoxidized fatty oil reaction products may be used to form coatings or films on various substrates including glass, wood, metal or plastic, etc. at room temperatures or at elevated temperatures. In addition to providing clear transparent varnish like films, solutions of the reaction products may be used as carriers for various pigments or dyes generally used in coatings. These may include, for example, titanium dioxide, lithopone, carbonate white lead, zinc oxide, red iron oxide, yellow iron oxide, chrome yellow, chrome green, carbon black, lamp black, aluminum powders and the like.

While this invention has been described with respect to a number of specific embodiments, it is obvious that other variations and modifications may be made without departing from the spirit and scope of the invention as set forth in the appended claims.

What is claimed is:

1. A polymeric composition prepared by coreacting at temperatures of at least about 50°C and in the presence of an effective amount of organic peroxide approximately 50 to 95% by weight of at least one aliphatic vinyl ester and 5 to 50% by weight of at least one

TABLE I

| Ex. No. | Epoxidized Parts by Wt. | Soya Oil Percent | Vinyl Acetate Parts by Wt. | Percent | Remarks |
|---|---|---|---|---|---|
| 2 | 150 | 15 | 850 | 85 | |
| 3 | 100 | 10 | 900 | 90 | |
| 4 | 50 | 5 | 950 | 95 | Passed Stain cover test |
| 5 | 50 | 5 | 950 | 95 | Duplicated |
| 6 | 50 | 5 | 950 | 95 | Repeat |
| 7 | 250 | 33.3 | 750 | 66.6 | |
| 8 | 6000 | 25 | 18,000 | 75 | |
| 9 | 450 | 20 | 2550 | 80 | Pilot plant repeat. |
| 10 | 450 | 20 | 2550 | 80 | Pilot plant repeat. |

A stain cover paint composition was prepared in accordance with the following:

EXAMPLE A

| | Parts by Weight |
|---|---|
| Polymeric Composition of Example 6 | 585.50 |
| Ethanol | 225.00 |
| Oxalic Acid | 0.72 |
| Microne Talc 549 | 111.00 |
| Rutile Calcium Titanox | 572.00 | epoxidized fatty oil or epoxidized fatty-acid ester having at least one epoxide group per molecule.

2. The polymeric composition of claim 1 further characterized in that the temperature ranges from about 50°C to 170°C and the peroxide is present in an amount ranging up to about 3% by weight of the reactants.

3. The polymeric composition of claim 1 further characterized in that the organic peroxide is tertiary-butyl peroxy (2-ethyl) hexanoate.

4. The polymeric composition of claim 1 further characterized in that the vinyl ester is vinyl acetate present in an amount ranging from about 75 to 95% by weight and the epoxidized fatty oil is present in an amount ranging from about 5 to 25% by weight.

5. The polymeric composition of claim 4 further characterized in that the epoxidized fatty oil is an epoxidized soybean oil.

6. A process for preparing a polymeric composition which comprises coreacting at a temperature ranging from about 50°C to 250°C in the presence of at least 0.01% by weight of an organic peroxide catalyst, approximately 50 to 95% by weight of an aliphatic vinyl ester having 3 to 6 carbon atoms and 5 to 50% by weight of at least one epoxidized fatty oil or epoxidized fatty-acid ester having at least one epoxide group per molecule.

7. The process of claim 6 further characterized in that the vinyl ester is vinyl acetate.

8. A polymeric coating composition comprising an organic solvent and an effective amount of the polymeric composition of claim 1.

9. The polymeric coating composition of claim 8 further characterized in that the polymeric composition is present in the organic solvent in an amount ranging from about 5 to 99% by weight of the mixture.

10. The polymeric composition of claim 9 further characterized in that the organic solvent is a lower molecular weight aliphatic alcohol.

11. A polymeric composition prepared by coreacting at temperatures of at least about 50°C and up to about 250°C in the presence of an effective amount of an organic peroxide approximately 50 to 95% by weight of at least one aliphatic vinyl ester having up to ten carbon atoms and 5 to 50% by weight of at least one epoxidized fatty oil or epoxidized fatty-acid ester having up to 36 aliphatic carbon atoms and at least one epoxide group per molecule.

12. The polymeric composition of claim 11 further characterized in that the vinyl ester is vinyl acetate and the epoxidized fatty oil is an epoxidized drying oil or semi-drying oil.

13. The polymeric composition of claim 12 further characterized in that the epoxidized fatty oil is an epoxidized soybean oil, epoxidized tall oil, epoxidized linseed oil or epoxidized safflower oil.

* * * * *